United States Patent [19]

Friedman

[11] 4,091,316

[45] May 23, 1978

[54] METHOD AND APPARATUS FOR DAMPING STEPPER MOTORS

[75] Inventor: David Friedman, Bedford, Mass.

[73] Assignee: The Computervision Corporation, Bedford, Mass.

[21] Appl. No.: 620,125

[22] Filed: Sep. 30, 1975

[51] Int. Cl.² .............................................. G05B 19/40
[52] U.S. Cl. .................................... 318/696; 318/685
[58] Field of Search .............. 318/696, 685, 226, 227, 318/228, 138

[56] References Cited

U.S. PATENT DOCUMENTS

| 3,601,678 | 5/1970 | Abraham | 318/685 |
| 3,863,118 | 1/1975 | Lander et al. | 318/685 |
| 3,893,011 | 7/1975 | Inaba et al. | 318/696 |

Primary Examiner—Herman J. Hohauser
Attorney, Agent, or Firm—Richard J. Birch

[57] ABSTRACT

A method and apparatus for damping stepper motors are disclosed. A tachometer feedback is used to modulate the phase angle of the stepper motor command currents to achieve damping.

7 Claims, 1 Drawing Figure

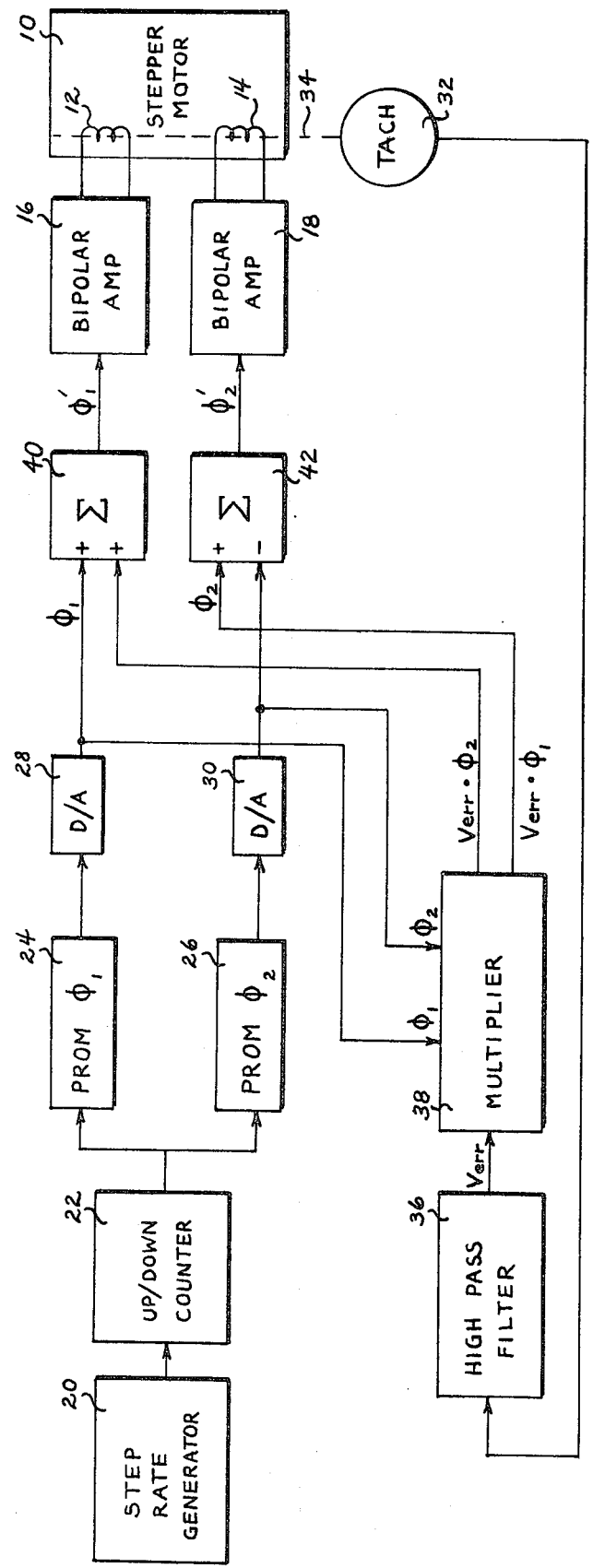

METHOD AND APPARATUS FOR DAMPING STEPPER MOTORS

BACKGROUND OF THE INVENTION

The present invention relates to stepper motors in general and, more particularly, to a method and apparatus for damping the basic motor resonance of a stepper motor at all frequencies of operation.

The art of stepper motor drive systems has progressed over the years from a "Full Step" mode of operation to a "Half Step" mode and most recently to finer resolutions created by using intermediate angular positions. In the case of conventional two phase incremental stepper motors, the normal "Full Step" mode comprises changing the current in the $\phi_1$ and $\phi_2$ coils (assumed to be at 90° to each other) by 90° increments. This "normal" operation produces a shaft motion in a standard 200 stepper revolution, $2\phi$ stepper motor of, (360°/200°) or 1.8° per step. Many applications require a finer resolution, and another popular configuration is the "Half Step" (i.e., 45° steps) resulting in 400 steps per revolution operation.

Both of these modes of operation are limited in performance by one significant fact — any sudden change in position results in shaft motion which is extremely underdamped. Thus, any sudden step of position or any sudden change in velocity results in ringing of the motor shaft. This ringing causes vibration and can, in itself, be the cause of "loss of synchronism" when the motor is used in a dynamic mode. If the position error, caused by the velocity transient, exceeds 2 steps, the motor will fall out of synchronism.

An increase in the drive resolution of stepper motors can be obtained by an extension of the "Half Step" concept to finer resolutions through the use of intermediate angular positions. An increase in resolution by a factor of 8/1 over the half step case can be achieved by abandoning the conventional discreet current value control concept, and assigning actual intermediate current values to the finer step positions.

In order to provide a maximum amount of flexibility in the assignment of intermediate current values, a PROM memory can be used to control the actual interpolated current values. During the testing of various motors of the $2\phi$ 200 step/revolution variety, it was found that the use of finer interpolation steps (64 positions per 360° vs. 8) plus a careful selection of the interpolated current values, eliminated one classical problem with $2\phi$ steppers — a loss of torque at the frequency at which the step rate synchronized with the mechanical shaft resonance. However, it was also observed that a second problem with stepper drives — a high level of vibration at frequencies near the rate at which either 2 major steps (complete current reversal) or 4 major steps (one current cycle) synchronized with the shaft resonance, was not eliminated. Various experiments with the shape of the interpolation showed modest changes in this phenomenon, but could not satisfactorily eliminate this source of machine vibration.

Despite an enormous improvement in motor smoothness due to finer steps, three problems still plague the current interpolation drive described above.

(1) Vibration when step rate is matched to motor resonance.
(2) Vibration when cyclic current waveshape matches motor resonance.
(3) Unexplained losses of motor synchronism when motor is running unloaded at high slew rates. These losses of synchronism can be monitored by a tachometer, which shows that a vibration at the motor shaft resonant frequency gets started and slowly builds up amplitude, eventually knocking the system out of synchronism. Presumably, this phenomenon is caused by some means of positive feedback — perhaps the change in lag angle creates less torque rather than more torque by a non-linear modulation of the motor reactance ?

The important factor in all three problems, is that they are related to the extremely underdamped mechanical shaft resonance.

The prior art has tried to attack these problems with the following techniques:

(1) Pulse Spacing — Pulse spacing is controlled to cause vibration cancelling of successive steps. This scheme works at low step rates, but cannot cope with high pulse rates, such as occur when starting a motor asynchronously, at maximum speed.
(2) Mechanical Resonance Damping — This method puts a mechanical device on the motor which has a loosy resonance at the frequency of interest. The scheme suffers from a need to critically match the Q and $W_R$ of the motor and damper, as well as by adding inertia to the system, thus lowering performance.
(3) Electronic Damping — Various means of imposing low impedance across the motor have been reported. These schemes produce damping by virtue of absorbing motor energy. The scheme suffers by imposing severe high speed limitations on the driver.

In view of the inadequacies of the prior art techniques, it is a general object of the present invention to provide an improved method and apparatus for damping incrementally driven stepper motors.

It is a specific object of the invention to provide a method and apparatus for making incrementally driven stepper motors perform as smoothly as DC torque motors.

It is another object of the invention to provide a method and apparatus for damping the basic motor resonance of a stepper motor at all frequencies of operation from DC to slew.

It is a feature of the present invention that the method thereof can be implemented with conventional hardware.

It is another feature of the invention that the method thereof can be employed with multiphase drivers as well as with two phase drivers.

These objects and features of the invention as well as other objects and features will best be understood from a detailed description of a preferred embodiment thereof, selected for purposes of illustration and shown in the accompanying drawing, in which:

The single FIGURE illustrates in block diagram form an apparatus constructed in accordance with the present invention for damping an incrementally drive stepper motor.

DETAILED DESCRIPTION OF A PREFERRED EMBODIMENT

Referring to the single FIGURE, there is shown in block diagram form an apparatus for critically damping the natural motor resonance of a conventional two phase stepper motor 10. The stepper motor 10 has two motor drive coils 12 and 14 which are energized by phase ONE and phase TWO command currents from corresponding linear bipolar amplifiers 16 and 18.

The two phases of the command currents have a basic phase relation of a 90° shift with respect to each other. These currents are derived from a step rate generator or clock 20 which is imputted to an UP/DOWN counter 22. If the modulo of counter 22 is "four", then the stepper motor will be driven in the "Full Step" mode. Similarly, a modulo of "eight" produces a "Half Step" operation while higher number modulos produce the previously mentioned finer resolution steps.

Assuming for purposes of illustration that stepper motor 10 is to be operated with interpolated command currents to produce the desired intermediate angular positions, the modulo count of counter 22 is imputted to phase ONE and phase TWO PROMS 24 and 26, respectively. The PROM memory is used to control the actual interpolated current valves. The digital outputs from the two PROMS are converted into corresponding analog current values by digital-to-analog connecters 28 and 30.

In a conventional stepper motor drive system the two phase currents $\phi_1$ and $\phi_2$ would be fed to the motor drivers 16 and 18. However, in the present invention, a correction feedback ($\phi_1'$ a $\phi_2'$) proportional to a velocity error is generated to damp the stepper motor. The correction feedback is derived in the following manner: Assuming a basic shaft angle $\phi_1$ and a desired pertebation E:

$$SIN (\phi + E) = SIN \phi \, COS \, E + COS \phi \, SIN \, E = SIN \phi + E \, COS \phi$$

$$COS (\phi + E) = COS \phi \, COS \, E - SIN \phi \, SIN \, E = COS \phi - E \, SIN \phi$$

If one designates the motor phases $\phi_1$ and $\phi_2$ and remembers that their fundamental waveshapes are SIN/COSINE related, then a correction feedback proportional to velocity error is achieved by:

$$\phi_1' = \phi_1 + V_{err} \phi_2$$

$$\phi_2' = \phi_2 - V_{err} \phi_1$$

The velocity feedback term $V_{err}$ is obtained from a tachometer 32 that is coupled to the stepper motor shaft 34. The term is preferrably passed through a high pass filter 36 to allow damping of transients while avoiding the necessity for handling a large dynamic range velocity error term.*

*An alternative is to subtract a commanded velocity term from the measured velocity, to lower the dynamic range.

The filtered, velocity error $V_{err}$ is multiplied with the $\phi_1$ and $\phi_2$ command currents in a multiplier 38 to produce two output signals $V_{err}\phi_1$ and $V_{err}\phi_2$. The $V_{err}\phi_2$ signal is added to the command current $\phi_1$ in a adder 40 to generate the $\phi_1'$ correction feedback that is proportional to the velocity error. The same addition function is performed by adder 42 to generate the $\phi_2'$ correction feedback. The resulting $\phi_1'$ and $\phi_2'$ currents are applied to the phase ONE and phase TWO bipolar amplifiers 16 and 18 for driving the stepper motor coils 12 and 14, respectively.

From the preceding description, it will be appreciated that my invention used the addition of tachometer feedback in such a way as to modulate the phase angle of the command currents to damp the basic motor resonance of a stepper motor at all operating frequencies from DC to slew. The apparatus uses linear drivers to achieve proper operation only at low speeds when ringing frequencies are high compared to the basic phase cyclicity, but at high slew speeds, damping takes place by advancing or retarding the phase current sign reversals. Thus, the method and apparatus works for pure digital motor drives as well.

Having described in detail a preferred embodiment of my invention, it will now be apparent to those skilled in the art that numerous modifications can be made therein without departing from the scope of the invention as defined in the following claims.

What I claim and desire to secure by Letters Patent of the United States is:

1. A method for damping a plural phase, incrementally driven stepper motor independently of the load thereon, said method comprising the steps of:
    (1) generating command currents for driving the stepper motor;
    (2) generating a signal representing the shaft velocity error of the stepper motor; and,
    (3) altering the phase angle of the command currents relative to their normal positions in response to said velocity error signal.

2. A method for damping a two phase, incrementally driven stepper motor independently of the load thereon, said method comprising the steps of:
    (1) generating phase ONE and phase TWO command currents $\phi_1$ and $\phi_2$, respectively, for driving the stepper motor;
    (2) generating a signal $V_{err}$ representing the shaft velocity error of the stepper motor;
    (3) multiplying the command current $\phi_2$ and the velocity signal $V_{err}$ together and then adding the resultant to the $\phi_1$ command current to produce a correctional feedback current $\phi_1' = \phi_1 + V_{err}\phi_2$ for the phase ONE drive; and,
    (4) multiplying the command current $\phi_1$ and the velocity signal $V_{err}$ together and then adding the resultant to the $\phi_2$ command current to produce a correctional feedback current $\phi_2' = \phi_2 - V_{err}\phi_1$ for the phase TWO drive.

3. The method of claim 2 wherein said velocity signal $V_{err}$ is passed through a high pass filter before being multiplied with said command currents $\phi_1$ and $\phi_2$.

4. In a plural phase, incrementally driven stepper motor, an apparatus for damping the stepper motor independently of the load thereon, said apparatus comprising:
    (1) means for generating a signal representing the shaft velocity error of the stepper motor; and,
    (2) means responsive to said velocity signal for altering the phase of the stepper motor command currents relative to their normal position.

5. In a two phase, incrementally driven stepper motor, an apparatus for damping the stepper motor independently of the load thereon, said apparatus comprising:
    (1) means for generating a signal $V_{err}$ representing the shaft velocity error of the stepper motor; and,
    (2) means responsive to the velocity signal $V_{err}$ for altering the phase angle of the stepper motor phase ONE command current $\phi_1$ and the phase TWO command current $\phi_2$ relative to their normal positions.

6. The apparatus of claim 5 wherein said velocity signal $V_{err}$ generating means comprises a tachometer and said responsive means comprises:

(1) a multipler for multiplying the velocity signal with the command currents $\phi_1$ and $\phi_2$ to produce resultants $V_{err} \cdot \phi_1$ and $V_{err} \cdot \phi_2$ respectively;

(2) a first summing means for adding the $\phi_1$ command current and the $V_{err} \cdot \phi_2$ resultant to produce a correction feedback current $\phi_1' = \phi_1 + V_{err}\phi_2$ for driving phase ONE of the stepper motor; and, (3) a second summing means for adding the $\phi_2$ command current and the $V_{err} \cdot \phi_1$ resultant to produce a correction feedback current $\phi_2' = \phi_2 - V_{err}\phi_1$ for driving phase TWO of the stepper motor.

7. The apparatus of claim 6 further comprising high pass filter means for filtering the $V_{err}$ signal before multiplication with the command currents $\phi_1$ and $\phi_2$.

* * * * *